March 8, 1966      A. P. FEGLEY      3,239,718

HIGH SPEED ALTERNATING CURRENT FAULT SENSING CIRCUIT

Filed Sept. 18, 1962      4 Sheets-Sheet 1

INVENTOR.
ALBERT P. FEGLEY
BY
Charles R. Lechinsky
ATTORNEY

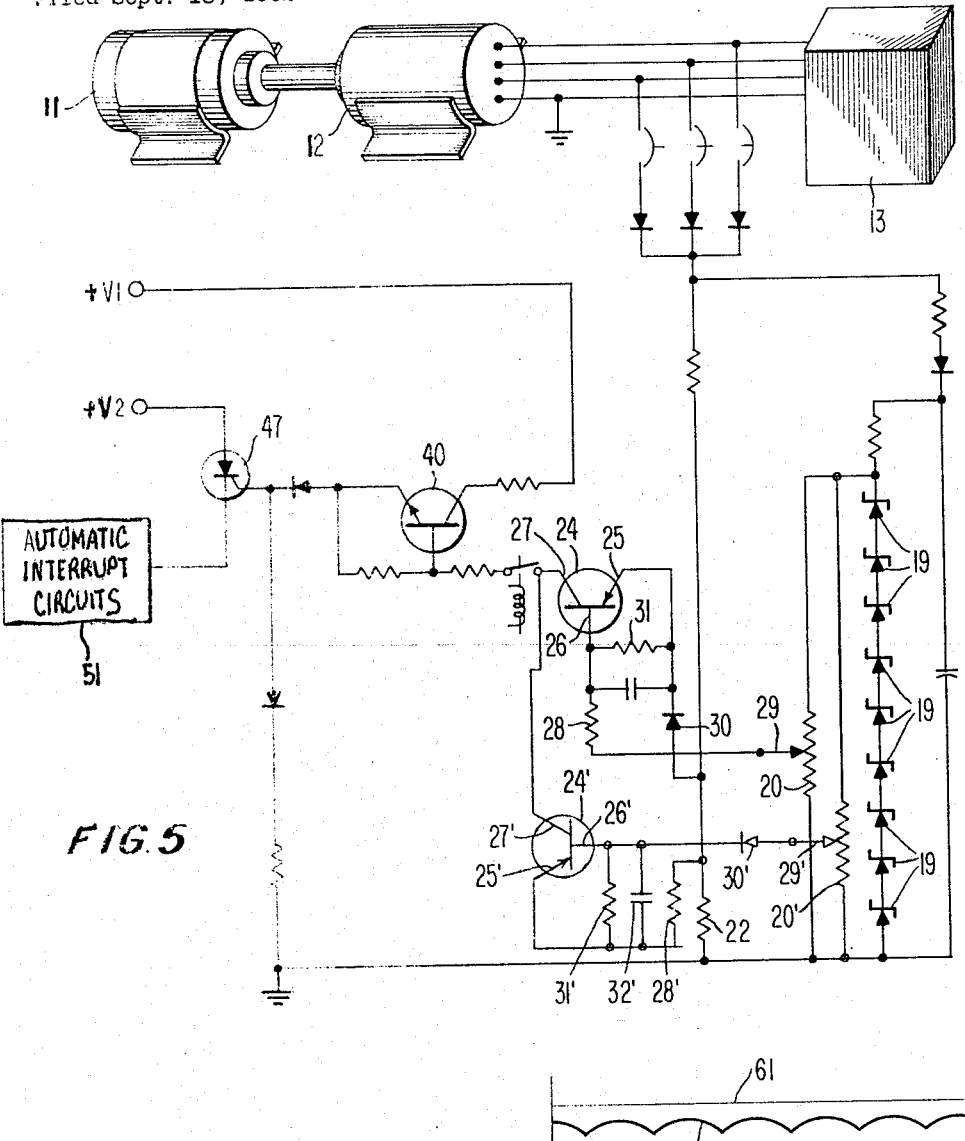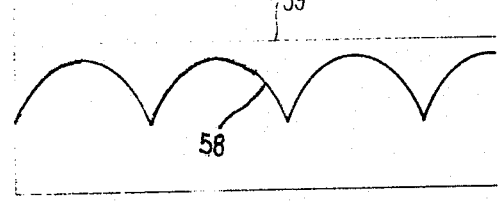

United States Patent Office 3,239,718
Patented Mar. 8, 1966

3,239,718
HIGH SPEED ALTERNATING CURRENT FAULT
SENSING CIRCUIT
Albert P. Fegley, Birchrunville, Pa., assignor to Burroughs
Corporation, Detroit, Mich., a corporation of Michigan
Filed Sept. 18, 1962, Ser. No. 224,344
10 Claims. (Cl. 317—32)

This invention relates to a high speed alternating current fault sensing circuit and more particularly to a high speed fault sensing circuit that produces a signal indicative of a fault in a source of alternating current power within two microseconds of the time that an unfiltered rectified alternating current would be affected by an under-voltage or an over-voltage of a three phase alternating current power source.

The operational characteristics of some electronic equipment make it highly desirable that loss of primary alternating current power does not render work previously performed inefficacious or result in a loss of information. For example, consider the loss of primary alternating current power in an operating electronic computer. Data being processed at the time of the power failure will generally be destroyed, unless it happens to be stored in suitable storage devices such as magnetic cores. The data thus destroyed renders work previously performed by the computer, but not yet completed and read-out therefrom, useless. Once primary power is restored, valuable time is lost in resetting the computer to perform the task that was partially completed before the power failure.

A motor-generator unit, or storage batteries, may be used to supply power in case of a primary alternating current power failure. However, such equipment is bulky, expensive, and requires frequent maintenance. If a fault signal could be generated rapidly (within two microseconds after the occurrence of the fault, for example) that is indicative of an impending failure of primary alternating current power, the signal could be used to instruct the computer to interrupt whatever it is doing and to non-destructively store all the data being processed at that time. Storage capacitors of relatively small size could supply sufficient power to enable the computer to properly store such data after the fault signal is generated. Without the rapidly generated fault signal, much larger storage capacitors would be required to give the computer sufficient time to store all such data.

Accordingly, an object of this invention is to provide a high speed alternating current fault sensing circuit.

Another object of the present invention is to provide an improved high speed fault sensing circuit for sensing a fault in a source of alternating current power within two microseconds.

A further object of this invention is to provide an improved high speed fault sensing circuit for sensing an under-voltage in a source of alternating current power.

Another object of the present invention is to provide an improved high speed fault sensing circuit for sensing an over-voltage in a source of alternating current power.

A still further object of the present invention is to provide a high speed fault sensing circuit that produces a signal indicative of a fault in a source of alternating current power which may be utilized to interrupt the operation of electronic equipment being supplied with power by the alternating current power source.

These and other objects of the present invention are accomplishing by coupling rectifying means to the source of alternating current power which is to be monitored to provide an unregulated direct current voltage level. A second voltage divider is coupled to the unregulated voltage level to provide a direct current reference voltage. A second voltage divider is also coupled to the unregulated voltage level to provide a test voltage which can be compared with the reference voltage. Comparing means are coupled to said reference voltage and to said test voltage to provide an output indicative of a fault in the source of alternating current power whenever the test voltage differs from the reference voltage by a predetermined amount.

More specifically, the present invention discloses a circuit for sensing a fault in a source of alternating current power, within two microseconds of the time that an unfiltered rectified alternating current would be affected by an under-voltage or an over-voltage of a three phase alternating current power source, by coupling rectifying means to the source of alternating current power being monitored to provide an unregulated direct current voltage level. A first voltage divider, including a storage capacitor, is coupled to the unregulated voltage level to provide a stable regulated direct current reference voltage. A second voltage divider is also coupled to the unregulated voltage level to provide an unregulated direct current test voltage which can be compared with the regulated reference voltage. Comparing means such as a transistor switch is coupled to the regulated reference voltage and to the unregulated test voltage and provides an output whenever the test voltage differs from the reference voltage by a predetermined amount due to a fault in the primary alternating current supply. The output of the transistor switch is coupled to a fault signal generator which produces a signal indicative of a fault in the source of alternating current power in response to the output of the transistor switch. This fault signal is applied to suitable electronic equipment, such as an electronic computer, which utilizes the fault signal to interrupt its operations and to prepare for a loss of primary alternating current power.

A more detailed description follows in conjunction with the drawings wherein:

FIGURE 5 illustrates a further modification of the preferred circuit embodiment of the present invention shown in FIGURE 1;

FIGURE 6 illustrates voltage levels at various points in the circuit of FIGURE 5;

FIGURE 8 illustrates voltage levels at various points in the circuit shown in FIGURE 7.

Figure 1:
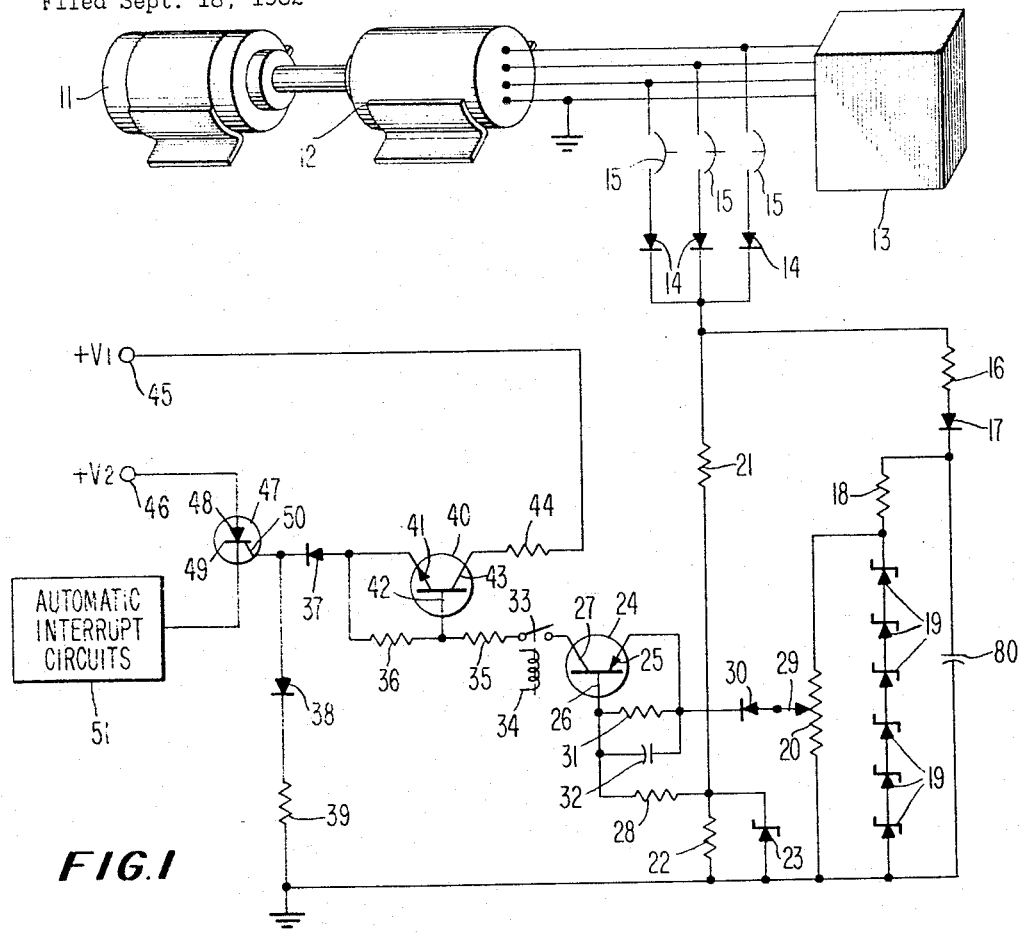
FIGURE 1 is a schematic and block diagram illustration of a preferred embodiment of the present invention.

Referring now to the drawings, wherein like reference characters designate like or corresponding parts throughout the several views, there is shown in FIGURE 1 (which illustrates a preferred embodiment of this invention) a source of alternating current power such as a motor 11 and generator unit 12 which supplies three phase alternating current to electronic equipment 13 such as an electronic computer. Each phase of the three phase alternating current power is also coupled to a half wave rectifier comprising three diodes 14 by way of a circuit breaker 15. The circuit breaker 15 is utilized to protect the fault sensing circuit. A first voltage divider network is coupled between ground potential and the output of the half wave rectifier and in the illustrative embodiment comprises a series circuit including a resistor 16, a diode 17, a resistor 18, and a plurality of temperature compensated reference diodes such as back biased zener diodes 19. Connected in parallel across the resistor 18 and the plurality of back biased zener diodes 19 is a storage capacitor 80, and connected in parallel across the plurality of zener diodes 19 is a potentiometer 20.

A second voltage divider network is coupled between the output of the half wave rectifier and ground potential and comprises a series circuit including a resistor 21 and a resistor 22. Connected in parallel with the resistor 22 is a back biased zener diode 23. The junction of the resistor 21 with the resistor 22 is coupled to a comparing device such as the base 26 of a first PNP switching transistor 24 by way of a resistor 28. The wiper arm 29 of the potentiometer 20 is also coupled by way of a diode 30 and a resistor 31 to the base 26 of the PNP transistor 24. Connected in parallel with the resistor 31 is a capacitor 32. The emitter 25 of the transistor 24 is connected to the junction of the resistor 31 with the diode 30. The collector 27 of the PNP transistor is connected to ground potential by way of a relay contact 33, a resistor 35, another resistor 36, a diode 37, another diode 38, and a resistor 39. The relay contact 33 is actuated by a relay coil 34. The relay contact is open when the electronic equipment is turned on or off, to prevent signalling an alternating current fault during normal turn off and to ensure that a fault signal does not occur due to transients that may occur during turn on. However, during the operation of the electronic equipment 13 the relay contact 33 is closed.

Second switching means such as an NPN transistor 40 has its base 42 connected to the junction of resistor 35 with resistor 36. Its collector 43 is coupled by way of a resistor 44 to a positive source of potential $+V_1$ which is applied to a terminal 45. The emitter 41 of the NPN transistor is connected to the junction of the resistor 36 with the diode 37. A controlled rectifier 47 has its anode 48 coupled to a source of positive potential $+V_2$, its gate 50 connected to the junction of the diode 38 with the diode 37, and has its cathode 49 coupled to automatic interrupt circuits 51 which may be physically located in the electronic equipment 13.

Figure 2:
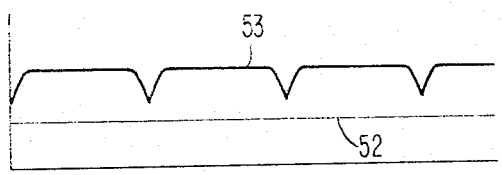
FIGURE 2 illustrates voltage levels at various points in the circuit shown in FIGURE 1.

Assume now that the generator 12 unit driven by the motor 11 is supplying full three phase alternating current power to the electronic equipment 13 which may be an electronic computer. Each phase of the three phase alternating current is supplied to the half wave diode rectifier 14 by way of the now closed circuit breaker 15. The positive half wave rectified voltage, which constitutes the output of the half wave rectifier, appears across the first voltage divider, and that is, the serial combination of the resistor 16, the diode 17, the resistor 18, and the plurality of back biased temperature compensated zener diodes 19. This voltage is sufficiently positive to back bias all of the zener diodes 19 causing them to conduct which develops a well regulated direct current voltage level that is applied across the potentiometer 20. The wiper arm 29 of the potentiometer 20 is adjusted to provide the proper magnitude of a regulated direct current reference voltage which is indicated in FIGURE 2 by the reference character 52.

The half wave rectified output of the diode rectifier 14 is also applied to the second voltage divider comprising the resistor 21 serially connected to the resistor 22. An unregulated test voltage appears at the junction of the two resistors and is indicated by the reference character 53 in FIGURE 2. Reference to FIGURE 2 shows that the most positive portions of the test voltage 53 are clamped by the zener diode 23 (FIGURE 1) which is across the resistor 22. This prevents a high positive voltage from damaging the transistor 24.

Referring again to FIGURE 2, the reference voltage 52 appearing on the wiper arm 29 of the potentiometer 20 is adjusted to be less positive than the test voltage 53 appearing at the junction of resistor 22 with resistor 21.

For this condition, the diode 30 is non-conducting thereby preventing any current from flowing into the wiper arm 29 of the potentiometer 20 from the second voltage divider comprising resistors 21 and 22. Accordingly, no difference of potential exists between the emitter 25 and the base 26 of the PNP switching transistor 24 thereby causing transistor 24 to be non-conducting. Since the PNP transistor 24 is non-conducting, no potential appears on the base 42 of the NPN transistor 40 which can render the NPN transistor conducting. As discussed herein above, while the alternating current power is being supplied to the electronic equipment 13, the relay contact 33 is closed creating an electrical path between the collector 27 of the PNP transistor 24 and the base 42 of the NPN transistor 40. Since both transistors are non-conducting, no potential appears at the junction of the diode 37 with the diode 38 which is coupled to the gate 50 of the controlled rectifier 47. Accordingly, the controlled rectifier is non-conducting, that is, substantially an open circuit, and no voltage is applied to the automatic interrupt circuits 51.

Assume now that a portion of the half wave rectified voltage constituting the output of the half wave diode rectifier begins to decrease due to a decrease in the voltage being supplied by the generator 12 unit prior to a complete power failure. This decrease in voltage also appears in the test voltage 53 which is located at the junction of resistor 21 with resistor 22. The reference voltage 52 appearing at the wiper arm 29 of the potentiometer 20 does not decrease significantly immediately because any decrease of voltage across the first voltage divider causes the capacitor 80 to discharge through the resistor 18 and the plurality of zener diodes 19. The diode 17 prevents the capacitor 80 from discharging through the resistors 16, 21 and 22. Whenever the test 53 voltage (shown in FIGURE 2) becomes less positive than the reference 52 voltage (shown in FIGURE 2) current will flow from the wiper arm 29 of the potentiometer 20 through the diode 30, through the resistor 31, through the resistor 28, and through the resistor 22 to ground. This current flows through the emitter 25 base 26 diode of the transistor 24 causing the transistor 24 to conduct in its saturation region. The collector 27 current of the PNP transistor 24 flows through resistor 35, the resistor 36, the diode 37, the diode 38, and the resistor 39 to ground. The collector 27 current of the PNP transistor 24 does not necessarily drop sufficient voltage across the diode 38 and the resistor 39, which voltage appears on the control electrode 50 of the controlled rectifier 47, to cause the controlled rectifier to fire.

However, the collector 27 current of transistor 24 flows through the base 42 emitter 41 diode of the transistor 40 which causes the transistor 40 to conduct in its saturation region. The conduction of the NPN transistor 40 causes current flow from the terminal 45, through the resistor 44, through NPN transistor 40, through the diode 37, through the diode 38, and through the resistor 39 to ground. Conduction of the transistor 40 in its saturation region causes substantially all of its collector potential $+V_1$ to appear on the control 50 of the controlled rectifier 47 causing it to fire and conduct heavily. The conduction of the controlled rectifier 47 causes the positive potential $+V_2$ on the terminal 46 to be applied to the automatic interrupt circuits 51 as a fault signal indicative of an immediately impending loss of primary alternating current power.

The controlled rectifier 47 is a three terminal semiconductor device which operates in a similar fashion to that of a thyratron. That is, a relatively small voltage applied to the control 50 causes the controlled rectifier to conduct heavily and the magnitude of current flow is limited only by the external voltage and circuit impedance. Once the controlled rectifier is fired, it is turned off by reducing its anode current to less than the holding value by decreasing the voltage applied to the anode 48 to zero or by diverting the current around the device.

To ensure that the controlled rectifier 47 remains conducting for a period of time sufficient to produce a useful fault signal, its anode 48 is returned to a source of potential that is independent of the primary alternating current power source. For example, the anode may be connected to a small battery or to a storage capacitor which will supply sufficient power to enable the controlled rectifier to remain conducting for a period of time after failure of the primary power supply.

Referring again to FIGURE 1 resistors 18, 28, 35, and 44 are current limiting resistors and resistors 36 and 31 are used to bias the transistors 40 and 24 respectively. Also, resistor 39 establishes a path from the emitter 41 of the NPN transistor 40 to ground to ensure saturation of this transistor when the proper voltage is applied to the base 42. As mentioned previously, the diode 17 ensures that all power stored in the capacitor 80 discharges into the resistor 18 and the plurality of zener diodes 19. Diodes 30 and 37 are used to protect the transistors 24 and 40 and the controlled rectifier 47 from damaging inverse voltages that may occur. The diode 38 aides in preventing positive noise transients from firing the controlled rectifier 47. The back biased zener diode 23 shunts to ground any excess positive voltage which may occur across the resistor 22 which may damage the PNP resistor 24.

An embodiment of the present invention shown in FIGURE 1 was constructed that generated a fault signal within 2 microseconds of the time that an unfiltered rectified alternating current voltage would be affected by an under-voltage of a three phase alternating current power source. The fault signal so generated was applied to automatic interrupt circuits in an electronic computer that, in effect, instructed the computer to stop whatever it was doing at the time and to store all information being processed. By rapidly generating this fault signal, relatively small storage capacitors were able to be utilized to supply operating power to the computer for the short period of time, after failure of the primary power supply, needed by the computer to so store data being processed at the time of the power failure. Such a computer and the corresponding interrupt circuits are fully described in a copending application entitled Modular Computer System, Serial No. 246,855, filed November 30, 1962, and asigned to the same assignee as the present invention.

Figure 4:
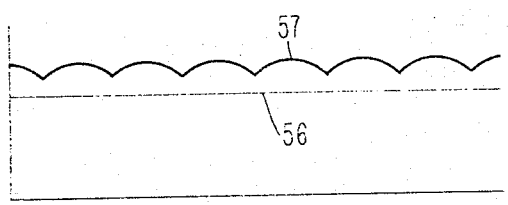
FIGURE 4 illustrates voltage levels at various points in the circuit shown in FIGURE 3.
Figure 3:
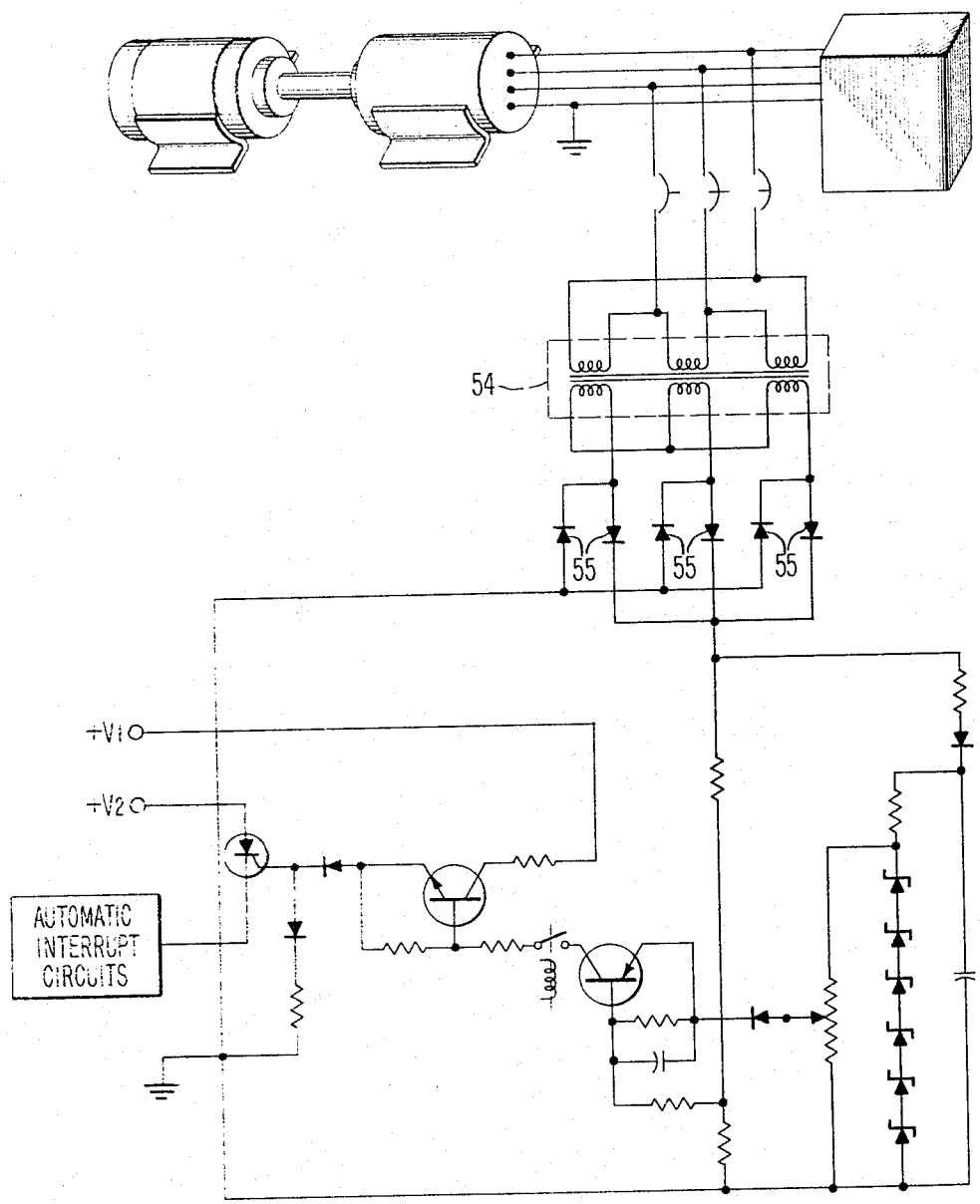
FIGURE 3 illustrates a modification of the preferred circuit embodiment of the present invention shown in FIGURE 1.

FIGURE 3 shows a modification of the circuit shown in FIGURE 1 wherein a pulse transformer, shown within the dotted outline 54, is utilized, for isolation purposes, in conjunction with a full wave rectifier comprising the plurality of diodes 55. A pulse transformer is used because its low inductance enables the fault sensing circuit to respond rapidly to changes in the primary alternating current power source. If a regular power transformer is utilized in place of the pulse transformer, it should be heavily loaded so that stored energy will be dissipated rapidly. The operation of the circuit shown in FIGURE 3 is identical to the operation of the circuit shown in FIGURE 1 except that the ripple appearing across the voltage divider networks is less pronounced because the voltage is full wave rectified rather then being half wave rectified which eliminates the need for the zener diode 23 illustrated in FIGURE 1. This property is illustrated in FIGURE 4 wherein the unregulated test voltage is indicated by the reference character 57 and the regulated reference voltage is indicated by the reference character 56.

It is clear that the circuits described in detail herein above and shown in FIGURES 1 and 3 provide a fault signal when ever the primary alternating current power source develops an under-voltage indicative of an impending primary power failure.

Referring now to FIGURE 5, there is shown a modification of the circuit of FIGURE 1 which develops a fault signal in response to an over-voltage appearing on the primary alternating current power source. In order to accomplish this the wiper arm 29 of the potentiometer 20, instead of being connected to the emitter 25 of the PNP transistor 24 as shown in FIGURE 1, is now coupled to the base 26 of the transistor by way of the current limiting transistor 28. The test voltage appearing across the resistor 22, instead of being coupled to the base of the PNP transistor 24, is now coupled by way of diode 30 to the emitter 25 of the transistor 24. That is, in the circuit shown in FIGURE 5 the base 26 and the emitter 27 connections of the PNP transistor 24 are reversed from the arrangement illustrated in FIGURE 1.

Referring now to FIGURE 6, the test voltage appearing across the resistor 22 is indicated by the reference character 58 and the reference voltage appearing at the wiper arm 29 of the potentiometer 20 is indicated by the reference character 59. In order to sense an over-voltage, the magnitude of the reference voltage is made more positive than the most positive portion of the unregulated test voltage, as illustrated in FIGURE 6. Under these conditions, the diode 30 is back biased and no current flows from the wiper arm 29 of the potentiometer 20, through the resistor 28, through the resistor 31, through the diode 30, and through the resistor 22 to ground.

However, when an over-voltage occurs in the primary power source, the magnitude of the test voltage becomes more positive than the reference voltage. The reference voltage magnitude remains stable because there is a constant voltage drop across the plurality of back biased zener diodes 19. This causes a current to flow through the diode 30, the resistors 31 and 28, and into the wiper arm 29 of the potentiometer 20. This current, forwardly biases the PNP transistor 24 causing it to conduct in the saturation region. This in turn causes the NPN transistor 40 to conduct which causes the controlled rectifier 47 to conduct thereby creating a fault signal which is applied to the automatic interrupt circuits 51 in a manner substantially as described herein above in conjunction with the operational description of FIGURE 1. It is clear that the operation of the circuit shown in FIGURE 5 is very similar to that of the circuit shown in FIGURE 1; except, by reversing the base and emitter connections of the PNP transistor 24, the circuit now will sense an over-voltage whereas the circuit of FIGURE 1 is adapted to sense an under-voltage. In as much as a higher magnitude of regulated reference voltage is required by the circuit of FIGURE 5, to achieve the same degree of sensitivity as the circuit of FIGURE 1, a larger number of temperature compensated zener diodes 19 are required as is shown in FIGURE 5.

For certain applications, it may be desirable to derive a single fault signal that is indicative of an under-voltage or an over-voltage in the alternating current power source. This may be accomplished in the circuit of FIGURE 5 by adding another potentiometer 20 across the plurality of temperature compensated zener diodes 19 and by using two comparing or switching transistors 24; one comparing transistor 24 senses an under-voltage and the other an over-voltage. A circuit for accomplishing this is shown in FIGURE 5 wherein there is illustrated a second switching or comparing transistor 24' having its collector 27' connected to the collector 27 of the transistor 24. As discussed herein above in detail, the transistor 24 conducts in response to an over-voltage in an alternating current power source. The base 26' of the transistor 24' is coupled to the wiper arm 29' of a second potentiometer 20', which is in parallel with the plurality of zener diodes 19, by way of a diode 30'. The emitter 25' of the transistor 24' is coupled to the unregulated test voltage level, which appears across the resistor 22, by way of a current limiting resistor 28'. A biasing resistor 31' and a capacitor 32' is connected between the base 26' and the emitter 25' of the transistor 24'. It is seen that the second switching or comparing transistor 24' is connected in a manner substantially identical to transistor 24 of FIGURE 1.

The wiper arm 29' of the potentiometer 20' is adjusted to provide a regulated reference voltage that is less positive than the unregulated test voltage seen across the resistor 22 and which appears on the emitter 25' of the transistor 24'. This causes the diode 30' and the transistor 24' to be non-conducting because no current flows between the test voltage and the reference voltage seen at the wiper arm 29'. However, when the voltage of the alternating current power source decreases, transistor 24' conducts which causes transistor 40 to conduct, which in turn causes the controlled rectifier 47 to fire causing the positive potential $+V_2$ to be applied to the automatic interrupt circuits 51, in a manner as previously described in detail herein above in conjunction with FIGURE 1. Any over-voltage that occurs cause the transistor 24 to conduct causing the positive $+V_2$ potential to be applied to the automatic interrupt circuits 51 as previously described herein above in conjunction with FIGURE 5. For this arrangement, the fault signal generated is indicative of an over-voltage or an under-voltage. It will be clear to those skilled in the art that the circuits shown in FIGURES 1, 3, and 7 may be adapted to produce a fault signal in response to an over-voltage and an under-voltage by utilizing two comparing or switching transistors as described in conjunction with FIGURE 5.

Figure 7:
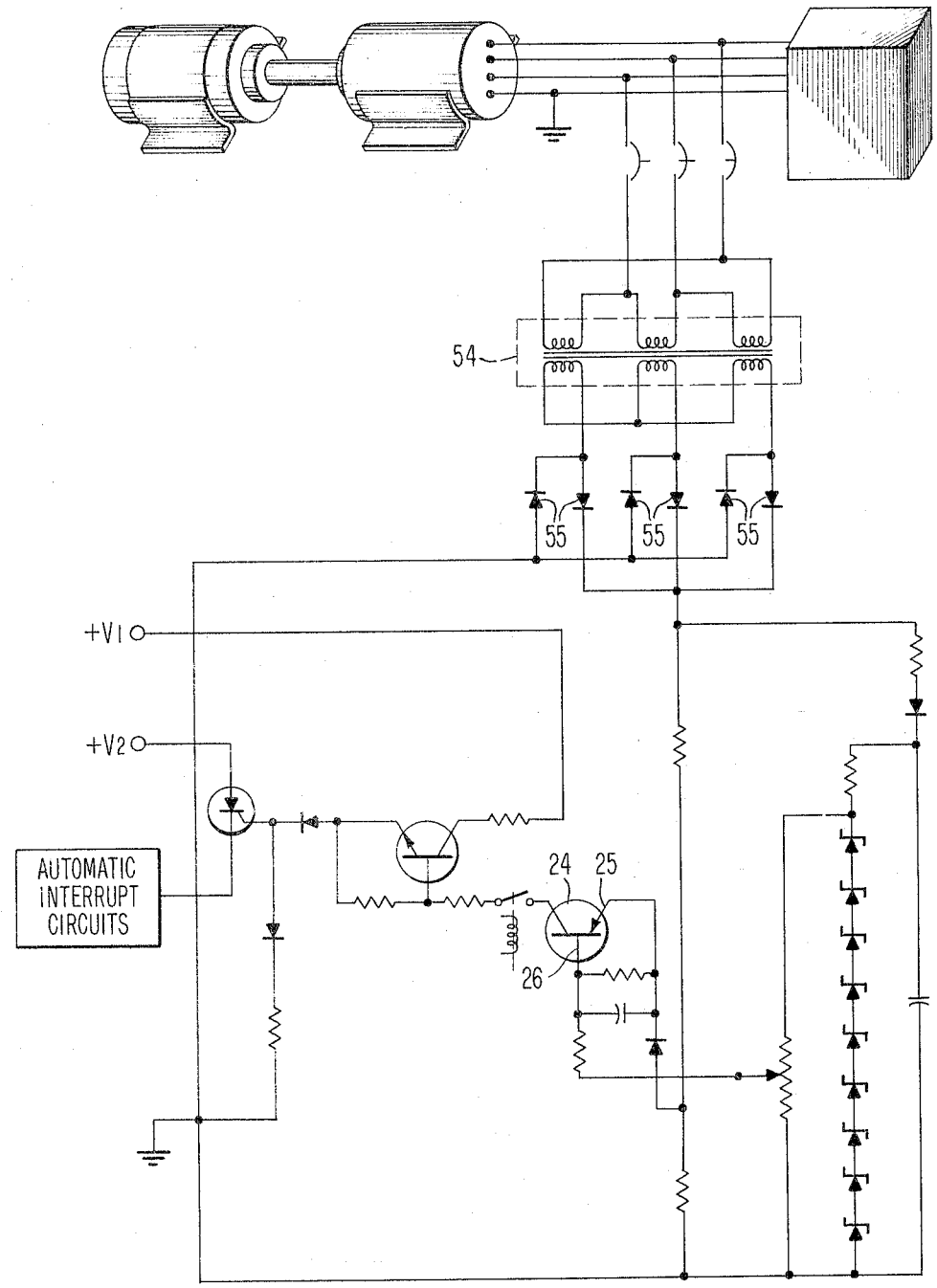
FIGURE 7 illustrates still another modification of the preferred circuit embodiment of the present invention shown in FIGURE 1.

Referring now to FIGURE 7, there is shown the circuit of FIGURE 5 further including a pulse transformer within the dotted outline 54 which is associated with a full wave diode rectifier comprising the diodes 55. FIGURE 7 is generally similar to FIGURE 3 but is capable of sensing an over-voltage by virtue of having the emitter 25 and the base 26 connections of the PNP transistor 24 reversed in a manner similar to the circuit shown in FIGURE 5. The unregulated test voltage and the regulated reference voltage of the circuit of FIGURE 7 is illustrated in FIGURE 8 by the reference characters 60 and 61 respectively. The operation of the circuit in FIGURE 7 is substantially identical to the circuit in FIGURE 5 which in turn, as explained previously, is very similar to the operation of the circuit shown in FIGURE 1.

What has been described is a high speed fault sensing circuit that produces a signal indicative of impending fault or power failure in a source of primary alternating current power. This is accomplished by connecting a rectifier circuit to the primary alternating current source being monitored. Coupled to the output of the rectifier circuit is a first voltage divider network which provides a regulated reference signal which is compared with an unregulated test signal provided by a second voltage divider network which is also coupled to the output of the rectifier circuit. By comparing the test voltage level with the reference voltage level, a fault signal is derived whenever the test voltage level differs from the reference voltage level by a predetermined amount.

What I claim is:
1. A high speed alternating current fault sensing apparatus comprising:
    means for sensing an under-voltage in a source of alternating current power including,
    rectifying means coupled to said source of alternating current power for providing an unregulated direct current voltage level,
    first voltage divider means coupled to said unregulated voltage level for providing a regulated direct current reference voltage,
    resistor voltage divider means coupled to said unregulated voltage level for providing an unregulated direct current test voltage to be compared with said regulated reference voltage,
    a first transistor having its emitter coupled to said reference voltage and its base coupled to said test voltage for producing an output on its collector whenever the magnitude of said test voltage becomes less than the magnitude of said reference voltage, and
    a second transistor connected to a separate source of direct current and coupled to the collector of said first transistor to be responsively activated by the output current produced in the collector circuit of said first transistor and provide upon said responsive activation, a second current flow from said separate source of direct current through the collector circuit of said first transistor to thereby rapidly generate a fault signal.

2. A high speed alternating current fault sensing apparatus comprising:
    means for sensing an under-voltage in a source of alternating current power including,
    rectifying means coupled to said source of alternating current power for providing an unregulated direct current voltage level,
    first voltage divider means having a storage capacitor coupled to said unregulated voltage level for providing a regulated direct current reference voltage,
    second resistor voltage divider means coupled to said unregulated voltage level for providing an unregulated direct current test voltage to be compared with said regulated reference voltage,
    a unidirectional current device having at least two terminals one of which is coupled to said reference voltage, and
    a first transistor having its emitter coupled to the other terminal of said unidirectional current device and and its base coupled to said test voltage for producing an output on its collector which is indicative of a fault in said source of alternating current power whenever the magnitude of said test voltage becomes less than the magnitude of said reference voltage and a second transistor having its emitter connected to the collector circuit of said first transistor and its collector connected to a separate source of direct current whereupon activation of said first transistor, in turn, activates said second transistor to produce an output emitter current therefrom which combines with the output collector current from said first transistor to provide a common flow in the collector circuit of said first transistor and thereby rapidly provide a fault indicative output.

3. A high speed alternating current sensing apparatus comprising:
    means for sensing an over-voltage in a source of alternating current power including,
    means coupled to said source of alternating current power for providing an unregulated direct current voltage level,
    first means coupled to said unregulated voltage level for providing a direct current reference voltage,
    second means coupled to said unregulated voltage level for providing a direct current test voltage to be compared with said regulated reference voltage, and
    a first transistor having its emitter coupled to said test voltage and its base coupled to said reference voltage for providing an output in its collector which is indicative of a fault in said source of alternating current power whenever the magnitude of said test voltage is greater than the magnitude of said reference voltage,
    and a second transistor coupled to the collector circuit of said first transistor, said second transistor having an emitter, a base and a collector element, said collector element coupled to a separate source of direct current and said emitter and base elements coupled to the collector circuit of said first transistor, said second transistor being saturably responsive to the flow of collector current in said first transistor to provide a saturated output current flow from its emitter element which complements said flow of collector current from said first transistor to thereby rapidly indicate an over-voltage condition.

4. A high speed alternating current fault sensing apparatus comprising:
means for sensing a fault in a source of alternating current power comprising,
means coupled to a source of alternating current power for providing an unregulated direct current voltage level,
a first voltage divider network coupled to said unregulated output for providing a direct current reference voltage,
a second voltage divider network coupled to said unregulated voltage for providing a test voltage to be compared with said regulated reference voltage,
first switching means coupled to said reference voltage and to said test voltage for providing an output whenever said test voltage differs from said reference voltage by a predetermined amount,
second switching means connected to a separate source of direct current and coupled to said first switching means and adapted to produce a saturated output signal in response to the output signal of said first switching means, and
fault signal sensing means commonly coupled to said first and said second switching means for producing a signal indicative of a fault in said source of alternating power in response to the combined outputs of said first and said second switching means.

5. A high-speed alternating current fault sensing circuit comprising a rectifying means connected to the source of alternating current to provide an unregulated voltage source of direct current, a first and a second voltage divider network connected across said unregulated voltage source, one of said dividers having a voltage regulated portion to provide a regulated voltage reference level, a comparing means having a pair of input means respectively connected to said voltage reference level and to the other voltage divider network and output means connected to a load impedance to provide a first output fault sensing signal in response to a predetermined input level difference and a switching means connected to said comparing output means for switchably connecting a further source of direct current to said load impedance whereby the activation of said switching means by said first output fault sensing signal through said load impedance provides a second output signal through said load impedance and said first and said second output signals combine to provide a single output signal voltage level having rapid rise time characteristics.

6. The high-speed alternating current fault sensing circuit as set forth in claim 5 wherein said comparing means and said switching means are first and second transistors interconnected to a single load impedance.

7. The high-speed alternating current fault sensing circuit as set forth in claim 5 wherein said further source of direct current is a source of positive voltage, said switching means is an NPN transistor and said comparing means is a PNP transistor with the collector electrode of said PNP transistor and the emitter electrode of said NPN transistor intercoupled to commonly share a single load impedance.

8. An alternating current fault sensing circuit comprising rectifying means connected to an alternating current source to provide an unregulated direct current source, a first and a second voltage divider means connected to said unregulated direct current source, one of said voltage divider means including a current regulating means to provide a first and a second regulated reference voltage, a first and a second comparing means respectively connecting said first and second regulated reference voltages to a common point on the other of said voltage divider means, each of said comparing means providing an output signal corresponding to a predetermined difference between said compared voltages, a switching device commonly connected for activation to said first and second comparing means, said switching device connected between a direct current voltage source and said comparing means to provide an increased current output signal from said comparing means, a rectifying device having a control means which is connected to said comparing means for increased speed of activation by a control signal voltage level corresponding to said increased current output signal.

9. The fault sensing device as set forth in claim 8 wherein said first and second comparing means are first and second transistors having their collector electrodes commonly connected to a single load impedance and their base and emitter electrodes inversely connected between respective ones of said regulated reference voltage points and said other voltage divider.

10. A high-speed direct current voltage detection circuit comprising: a first and a second voltage dividing network connected across the direct current voltage source to be detected, one of which includes a voltage regulating means, a voltage level comparing means connected between said voltage regulating means and the other network to provide a first output current signal indicative of a predetermined inequality between the voltage levels of the sources compared and a current switching means connected between said comparing means and a further direct current source to provide a second output current signal in response to said first output current signal wherein said first and said second output current signals commonly provide an output signal voltage level having a fast rise time.

References Cited by the Examiner
UNITED STATES PATENTS

| | | | |
|---|---|---|---|
| 2,403,637 | 7/1946 | Christie | 321—18 X |
| 2,751,550 | 6/1956 | Chase | 317—148.57 |
| 3,007,102 | 10/1961 | Kennedy | 317—148.57 |
| 3,038,090 | 6/1962 | Patterson, Jr. | 308—88.5 |

OTHER REFERENCES

O'Malley: "Voltage Detection Circuit," published by IBM Technical Disclosure Bulletin, vol. 3, No. 6, November 1960.

SAMUEL BERNSTEIN, *Primary Examiner.*